(12) United States Patent
Matsuda et al.

(10) Patent No.: US 7,665,764 B2
(45) Date of Patent: Feb. 23, 2010

(54) GAS GENERATOR FOR AIR BAG

(75) Inventors: Naoki Matsuda, Himeji (JP); Masato Hirooka, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 140 days.

(21) Appl. No.: 11/033,736

(22) Filed: Jan. 13, 2005

(65) Prior Publication Data

US 2005/0200107 A1 Sep. 15, 2005

Related U.S. Application Data (60) Provisional application No. 60/537,541, filed on Jan. 21, 2004.

(30) Foreign Application Priority Data

Jan. 15, 2004 (JP) .............................. 2004-008356

(51) Int. Cl.
*B60R 21/26* (2006.01)
*B60R 21/264* (2006.01)
*B60R 21/272* (2006.01)

(52) U.S. Cl. ........................ 280/741; 280/736; 280/742

(58) Field of Classification Search ................. 280/736, 280/741, 742
See application file for complete search history.

(56) References Cited

U.S. PATENT DOCUMENTS

| | | | |
|---|---|---|---|
| 5,009,855 A | 4/1991 | Nilsson | |
| 5,472,534 A * | 12/1995 | Wardle et al. | 149/36 |
| 5,673,935 A * | 10/1997 | Hinshaw et al. | 280/741 |
| 6,095,559 A * | 8/2000 | Smith et al. | 280/741 |
| 6,190,474 B1 | 2/2001 | Yamato | |
| 6,196,581 B1 | 3/2001 | Katsuda et al. | |
| 6,234,521 B1 | 5/2001 | Katsuda et al. | |
| 6,315,322 B1 * | 11/2001 | Mika | 280/736 |
| 6,364,353 B2 * | 4/2002 | Green et al. | 280/736 |
| 6,378,901 B1 * | 4/2002 | Yamazaki et al. | 280/741 |
| 6,409,214 B2 | 6/2002 | Katsuda et al. | |
| 6,491,320 B1 * | 12/2002 | Nakashima et al. | 280/736 |
| 6,527,886 B1 * | 3/2003 | Yamato et al. | 149/45 |
| 6,540,256 B2 | 4/2003 | Iwai et al. | |
| 6,557,888 B1 * | 5/2003 | Nakashima et al. | 280/735 |

(Continued)

FOREIGN PATENT DOCUMENTS

EP 0012626 A1 6/1980

(Continued)

*Primary Examiner*—Paul N. Dickson
*Assistant Examiner*—Barry Gooden, Jr.
(74) *Attorney, Agent, or Firm*—Birch, Stewart, Kolasch & Birch, LLP (57) ABSTRACT

The gas generator includes, a housing having a gas discharge port, a first combustion chamber defined by the housing, a first gas generating agent adapted to generate gas to inflate an air bag, the first gas generating agent having a first combustion temperature and disposed in the first combustion chamber, a second gas generating agent adapted to generate gas to inflate the air bag, the second gas generating agent having a second combustion temperature lower than the first combustion temperature and disposed in the first combustion chamber, and a first ignition unit for directly igniting at least one of the first gas generating agent and the second gas generating agent.

12 Claims, 1 Drawing Sheet

U.S. PATENT DOCUMENTS

| | | | |
|---|---|---|---|
| 6,651,565 B1* | 11/2003 | Yamato et al. | 102/531 |
| 6,679,521 B2* | 1/2004 | Yamazaki et al. | 280/741 |
| 6,695,345 B2 | 2/2004 | Katsuda et al. | |
| 6,848,713 B2* | 2/2005 | Nakashima et al. | 280/741 |
| 6,886,856 B2* | 5/2005 | Canterberry et al. | 280/741 |
| 7,052,040 B2* | 5/2006 | Matsuda et al. | 280/741 |
| 7,059,632 B2* | 6/2006 | Iwakiri et al. | 280/736 |
| 2003/0160437 A1* | 8/2003 | Ohji et al. | 280/736 |
| 2004/0155444 A1 | 8/2004 | Matsuda et al. | |
| 2004/0207188 A1* | 10/2004 | Matsuda et al. | 280/741 |
| 2004/0245753 A1* | 12/2004 | Kato et al. | 280/736 |
| 2005/0001414 A1* | 1/2005 | Matsuda et al. | 280/741 |
| 2005/0161923 A1* | 7/2005 | Hirooka et al. | 280/741 |
| 2005/0189755 A1* | 9/2005 | Numoto et al. | 280/741 |

FOREIGN PATENT DOCUMENTS

| | | |
|---|---|---|
| EP | 1 195 367 A1 | 4/2002 |
| EP | 1 241 138 A1 | 9/2002 |
| EP | 1570900 A1 | 9/2005 |
| JP | 2169347 | 6/1990 |
| JP | 10-95303 A | 4/1998 |
| JP | 10509401 | 9/1998 |
| JP | 11509154 | 8/1999 |
| JP | 11-334517 A | 12/1999 |
| JP | 2000-319085 A | 11/2000 |
| JP | 3247929 B2 | 11/2001 |
| JP | 2002-12493 A | 1/2002 |
| WO | WO-9702160 | 1/1997 |
| WO | WO-9710974 | 3/1997 |
| WO | WO 01/72560 A1 | 10/2001 |
| WO | WO-2005/021328 A2 | 3/2005 |

* cited by examiner

GAS GENERATOR FOR AIR BAG

RELATED APPLICATIONS

This application claims priority under 35 U.S.C. §119(e) of Provisional Application No. 60/537,541 filed on Jan. 21, 2004, and incorporates by reference the subject matter of Application No. 2004-8356 filed in Japan on Jan. 15, 2004 on which a priority claim is based under 35 U.S.C. §119(a).

BACKGROUND OF THE INVENTION

1. Field of the Invention

The present invention relates to a gas generator for an air bag for protecting a passenger from an impact of a collision.

2. Description of Related Art

From the point of view of passenger protection, various demands have been made in relation to a gas generator for an air bag which is incorporated into an air bag system installed in an automobile. Examples of these demands include ensuring that the gas generator can be operated reliably over a typical expected lifespan (ten years or more) of the vehicle in which the air bag system is installed.

To reduce the size of the gas generator, it is desirable that a gas generating agent having a lower combustion temperature be used so that a coolant filter can be simplified. Another desirable effect of using a gas generating agent having a lower combustion temperature is that the amount of gas components, such as NOx, generated during combustion of the gas generating agent can be reduced.

However, it is also known that gas generating agents having a low combustion temperature typically suffer from poor ignitability. Nevertheless, to ensure that the gas generator operates reliably, it is desirable that the gas generating agent possesses both good ignitability and good combustibility.

Therefore, improving the cleanness of the gas and reducing the weight of the gas generator are antithetical technologically to ensuring operational reliability in terms of the ignitability and combustibility of the gas generating agent.

Moreover, the output of the gas generator is modified according to the type of vehicle to which the gas generator is installed. However, modifying the container or components inside the container every time the gas generator is installed leads not only to cost increases, but also to errors in the component assembly.

In the gas generator disclosed in JP-A No. 11-334517, a transfer charge is ignited and burned by an activation of an igniter, and a gas generating agent is ignited and burned by the resulting flame. In the gas generator disclosed in WO-A 01/72560, a transfer charge is ignited by the ignition, through electrification of an igniter, and a gas generating agent is burned by the resulting flame. Since the ignitability of a gas generating agent comprising a nitrogen-containing organic compound is particularly poor, an ignition chamber is provided to restrict the outflow of gas in a circumferential direction.

JP-A No. 11-334517 makes no statement as to the combustion temperature of the gas generating agent, and no references are made to problems caused by the combustion temperature. With the constitution disclosed in WO-A 01/72560, a gas generating agent having a lower combustion temperature cannot be burned effectively. Moreover, since there is no statement about using two or more types of gas generating agent having different combustion temperatures, output cannot be adjusted by combining gas generating agents having different combustion temperatures.

SUMMARY OF THE INVENTION

The present invention provides a gas generator for an air bag which can be reduced in weight while improving combustibility of a gas generating agent during an operation so that operational reliability can be ensured, and in which output adjustment can be performed easily while ensuring that clean gas is generated and operational reliability is sufficient.

The gas generator according to the present invention solves the problems described above by using a gas generating agent having higher combustion temperature and a gas generating agent having lower combustion temperature in combination, such that the gas generating agent having the lower combustion temperature is ignited and burned by the gas generating agent having the higher combustion temperature.

More specifically, the present invention provides a gas generator comprising a housing having a gas discharge port, ignition means for starting an operation of the gas generator, and a gas generating agent that generates gas by being ignited and burned in order to inflate an air bag, wherein the gas generating agent is charged into at least one combustion chamber defined in the housing, and at least two types of gas generating agents having different combustion temperatures are charged into at least one of the at least one combustion chamber.

In other words the invention is a gas generator comprising a housing having a gas discharge port, ignition means for starting an operation of the gas generator and a gas generating agent that generates gas by being ignited and burned in order to inflate an air bag and at least one combustion chamber defined in the housing, the gas generating agent being placed in at least one combustion chamber, at least two types of gas generating agents having different combustion temperatures from each other being placed in at least one of the combustion chamber.

PREFERABLE EMBODIMENTS OF THE INVENTION

The invention includes preferably a gas generator, comprising:
  a housing having a gas discharge port;
  a first combustion chamber defined by the housing;
  a first gas generating agent adapted to generate gas to inflate an air bag, the first gas generating agent having a first combustion temperature and disposed in the first combustion chamber;
  a second gas generating agent adapted to generate gas to inflate the air bag, the second gas generating agent having a second combustion temperature lower than the first combustion temperature and disposed in the first combustion chamber; and first ignition means for directly igniting at least one of the first gas generating agent and the second gas generating agent.

It is preferable that the first gas generating agent is charged in an amount that enables the second gas generating agent to be ignited and burned by combustion of the first gas generating agent.

It is preferable that the gas generator further comprising a partition member, having a communication hole, provided inside the first combustion chamber for separating the first gas generating agent and the second gas generating agent inside the first combustion chamber.

It is preferable that the partitioning member partitions the interior of the first combustion chamber in relation to the amount of first gas generating agent and the second gas generating agent charged in the first combustion chamber.

It is preferable that the gas generator further comprises:

a second combustion chamber defined within the housing;

a third combustion chamber defined within the housing;

a third gas generating agent adapted to generate gas to inflate the air bag, the third gas generating agent having a third combustion temperature and disposed in the second combustion chamber;

a fourth gas generating agent adapted to generate gas to inflate the air bag, the fourth gas generating agent having a fourth combustion temperature lower than the third combustion temperature and disposed in the second combustion chamber; and second ignition means for directly igniting at least one of the third gas generating agent and the fourth gas generating agent.

It is preferable that the first ignition means includes only an electric igniter ignited by applying an operating current, and the first gas generating agent is ignited directly by an activation of the electric igniter.

It is preferable that the first combustion temperature is between 1700 and 3000° C., and the second combustion temperature is between 1000 and 1700° C.

It is preferable that the third combustion temperature is between 1700 and 3000° C., and the fourth combustion temperature is between 1000 and 1700° C.

It is preferable that the gas generator further comprises an inner cylinder provided inside the housing and extending between a diffuser shell and a closure shell of the housing, wherein the partition member is a part of the inner cylinder.

It is preferable that the first gas generating agent has a non-perforated shape and the second gas generating agent has a single-perforated cylindrical shape.

It is preferable that the gas generator includes one, two or three combustion chambers.

DETAILED EXPLANATION OF THE INVENTION

With the gas generating agent described above, two or more types of gas generating agent having different combustion temperatures are charged into the same combustion chamber. The combustion temperature of the gas generating agent may be determined using a logical calculation, for example NEW PEP (new propellant evaluation program), which was created on the basis of a basic program of the U.S. Naval Weapons Center. The ignitability of a gas generating agent is typically commensurate with a combustion temperature, and hence when a gas generator is operated, the gas generating agent with the higher combustion temperature is preferably ignited first, and the gas generating agent with the lower combustion temperature is ignited and burned by the resulting flame. In so doing, the combustion temperature within the combustion chamber is reduced below that of a case in which only gas generating agents with a high combustion temperature are used, in proportion to the amount of gas generating agent with the lower combustion temperature that is used. As a result, a coolant filter used to purify and cool the gas can be simplified (for example, a coolant filter having sophisticated combustion gas purification and combustion gas cooling effects is not required), and gas components such as NOx can be reduced. Note that the charging amount of the gas generating agent with the lower combustion temperature is preferably greater than the charging amount of the gas generating agent with the higher combustion temperature.

When the gas generator is operated, first, the gas generating agent having the higher combustion temperature is ignited, and thus the gas generating agent having the lower combustion temperature can be ignited and burned reliably by the resulting flame. Using the gas generating agent having the higher combustion temperature is particularly favorable in that combustion continues for a long period of time (the gas generating agent having the lower combustion temperature is exposed to a high-temperature atmosphere for a long period of time), and hence the gas generating agent having the lower combustion temperature can be burned reliably by the resulting flame. Therefore, by combining these gas generating agents, the operational reliability of the gas generator can be ensured sufficiently, and hence an operationally reliable gas generator can be provided while reducing the weight of the gas generator and ensuring the cleanness of the generated gas. By varying the mixture ratio of the gas generating agent having the higher combustion temperature and the gas generating agent having the lower combustion temperature when the two gas generating agents are mixed, the combustion temperature of the gas generating agents used in the gas generator as a whole can be adjusted. Accordingly, by adjusting the charging ratio of the two gas generating agents, the output of the gas generator can be finely controlled, and hence there is no need to modify the constitutional components of the gas generator in order to achieve the required output. As a result, component assembly errors occurring when the constitutional components are modified can be eliminated.

Note, however, that in order to obtain these effects in the present invention, the two or more types of gas generating agents that are charged into the same combustion chamber should have different combustion temperatures. By using a combination of gas generating agents having different combustion temperatures, the gas generator of the present invention achieves effective combustion of the gas generating agent with the lower combustion temperature, a decrease in the combustion temperature of the gas generating agent as a whole, an improvement in the cleanness of the gas and a reduction in the weight of the gas generator.

In the gas generator of the present invention, the form and dimensions of the gas generating agents may be the same or different for the gas generating agent having the lower combustion temperature and the gas generating agent having the higher combustion temperature that are disposed in the same combustion chamber.

Further, the gas generating agent generates gas for inflating an air bag and simultaneously generates heat through combustion, but the heat is absorbed not only by the generated gas, but also by solid residue, and hence a gas generating agent which generates a large amount of heat does not necessarily have a high combustion temperature. It is therefore difficult to adjust the output according to the ratio of gas generating agents which generate different amounts of heat. In the gas generator of the present invention, on the other hand, at least two types of gas generating agents having different combustion temperatures are used, and these gas generating agents are disposed in the same combustion chamber. Thus, the combustion temperatures of the gas generating agents can be adjusted reliably. The gas generator of the present invention may be a single type comprising single ignition means or a dual type comprising two ignition means. Alternatively, the gas generator may be a multi-type gas generator comprising three or more ignition means.

It is preferable in the present invention that a gas generating agent having the higher combustion temperature, among the at least two types of gas generating agents disposed in the same combustion chamber, is charged in an amount enabling a gas generating agent with the lower combustion temperature to be ignited and burned, and such that the charging amount thereof can be adjusted optionally.

In the gas generator of the present invention, the gas generating agent having the higher combustion temperature, among the at least two types of gas generating agent disposed in the same combustion chamber, may be used in an amount at which the gas generating agent having the lower combustion temperature can be ignited and burned. The usage amount of the gas generating agent having the higher combustion temperature may be determined according to the composition, compositional ratio, form, and size of the respective gas generating agents, the usage amount of the gas generating agent having the lower combustion temperature, and so on.

The required output of the gas generator during an operation may differ depending on the vehicle type to which the gas generator is installed. If the internal constitution (or the constitutional components) is modified for every required output, assembly errors become more likely to occur. Output modification is performed typically by modifying the charging amount of the gas generating agent, or changing a cooling agent such as the filter or the coolant.

In the present invention, the gas generating agents having different combustion temperatures that are charged in the same combustion chamber are preferably charged in the amounts that can be adjusted optionally. The charging amount of each gas generating agent can be adjusted by adjusting the usage amounts of the respective gas generating agents charged into the same combustion chamber, the combined usage amount of the gas generating agents charged into the same combustion chamber, and the usage proportions of the gas generating agent having the higher combustion temperature and the gas generating agent having the lower combustion temperature which are charged into the same combustion chamber. For example, the charging amounts may be determined taking into consideration not only the ignitability of the gas generating agent having the lower combustion temperature, but also the combustion temperature generated in the combustion chamber. By combining gas generating agents with different combustion temperatures and adjusting the proportions and so on thereof, the temperature of the gas generated by the combined gas generating agent can be varied, thus enabling fine adjustment of the output. In other words, by varying the mixing ratio of the gas generating agents with different combustion temperatures, the temperature of the gas generated from the combined gas generating agent can be adjusted, thus enabling adjustment of the output of the gas generator. Particularly when the ratio of the gas generating agent having the higher combustion temperature and the gas generating agent having the lower combustion temperature charged into the same combustion chamber is varied, the volume of the entire combustion chamber does not change, and hence superfluous gaps and the like do not occur in the combustion chamber. The gas generating agents that can be charged into the same combustion chamber will be described in detail in the following embodiments.

It is preferable in the present invention that the ignition means comprises only an electric igniter activated by an operating current, and the gas generating agent having the higher combustion temperature, among the at least two types of gas generating agent, is adapted to be ignited directly by an activation of the electric igniter.

Instead of charging gas generating agents having different combustion temperatures into the same combustion chamber in an evenly mixed state, the charging amount of at least one of the types of gas generating agent may be distributed unevenly within the combustion chamber. When the charging amount of one of the gas generating agents is distributed unevenly, the gas generating agent having the higher combustion temperature, among the two or more types of gas generating agent, is preferably positioned, such that it may be ignited directly by the ignition means (electric igniter or the like). In most cases, the phrase "positioned such that it may be ignited directly by the ignition means (electric igniter or the like)" indicates it is provided in the vicinity of the ignition means, but when the flame and so on of the ignition means are guided to another location by a member (such as a tube or the like) or by the constitution of the gas generator, this phrase indicates the position to which the flame and so on of the ignition means are guided by the member. Specifically, the phrase "the vicinity of the ignition means" signifies that the gas generating agent having the higher combustion temperature is in contact with the ignition means, or if not in contact, at least within a range where it can be ignited by the ignition means before the gas generating agent having the lower combustion temperature.

By positioning the gas generating agent having the higher combustion temperature adapted to be ignited directly by the ignition means (such as electric igniter or the like) in this manner, the gas generating agent can be ignited and burned quickly and reliably, and hence all of the gas generating agents can be ignited and burned quickly and reliably. As a result, the operational reliability of the gas generator can be improved. In other words, since the gas generating agent having the higher combustion temperature typically has good ignitability, the gas generating agent having the higher combustion temperature can be ignited and burned directly by the ignition means alone. Therefore, when the gas generating agents having different combustion temperatures are used, the gas generating agent having the higher combustion temperature is disposed closer to the igniter (e.g., in contact therewith or at a distance enabling ignition) so that the gas generating agent having the high combustion temperature can be ignited and burned quickly and reliably, and so that the ignitability and combustibility of the gas generating agent having the lower combustion temperature can be improved by the resulting flame. Hence when the gas generating agents charged into the same combustion chamber are divided into a plurality of layers according to the combustion temperature of the gas generating agent, the ignition means, the gas generating agent having the higher combustion temperature, and the gas generating agent having the lower combustion temperature are preferably arranged or ignited in that order.

Note that the ignition means may include a transfer charge and an electric igniter. In this case, the transfer charge is ignited by activation of the igniter, and the transfer charge produces ignition energy in the form of a flame, high-temperature gas, and so on. This ignition energy ignites and burns the gas generating agent having the higher combustion temperature, and the resulting combustion energy ignites and burns the gas generating agent having the lower combustion temperature. The transfer charge used in the ignition means amplifies the thermal energy generated by activation of the igniter. Therefore, the gas generating agent is burned effectively, and thus differs from the gas generating agent having the higher combustion temperature in that it is not used to substantially generate a gas which contributes to inflation of the air bag. Accordingly, in the present invention, the transfer charge may be seen as an object having a gas generation efficiency of less than 1.2 mol/100 g. A mixture of boron and potassium nitrate (nitre) is used typically as this transfer charge. However, to reduce the size and weight of the gas generator, the ignition means is preferably constituted only by an electric igniter, and the gas generating agent having the higher combustion temperature is preferably ignited and burned directly by the electric igniter alone.

Further, this type of conventional transfer charge can be distinguished clearly from the gas generating agent having the higher combustion temperature used in the present invention in that since the transfer charge is used in a powder form, it burns instantaneously, producing only a minute amount of gas, and therefore cannot be used to inflate the air bag. Moreover, combustion of the transfer charge mainly produces thermal residue, and hence the transfer charge cannot be used for fine control of the output of the gas generator.

It is preferable in the present invention that at least two types of gas generating agents disposed in the same combustion chamber are partitioned and charged separately from each other according to the type within the same combustion chamber by a partitioning member(s) having a communicating hole.

When the gas generating agents charged in the same combustion chamber are divided into a plurality of layers according to the combustion temperature of the gas generating agent, the at least two types of gas generating agents disposed in the same combustion chamber are preferably partitioned separately from each other according to type within the same combustion chamber by a partitioning member(s) having a communicating hole. By partitioning a single combustion chamber using the partitioning member, the gas generating agents can be charged easily, and mixing of the gas generating agents caused by vibration when the gas generator is loaded into a vehicle can be prevented. In other words, when the partitioning member is used, the gas generating agent having the lower combustion temperature can be held in a desired location (e.g., in the vicinity of the ignition means or the like) securely.

When one or all of the combustion chambers are partitioned using a partition plate, partitioning may be performed using an appropriate cushioning member formed to communicate the partitioned spaces with each other by becoming displaced, shifting, rupturing, vanishing, or a similar action caused by combustion of the gas generating agent, instead of a partition plate comprising the aforementioned communicating hole. This cushioning member may be formed into a flat plate form which matches the cross-sectional form of the combustion chamber in which it is disposed, or an appropriate three-dimensional form which can be disposed inside the combustion chamber, using an appropriate material such as a resin material, for example. Needless to say, the cushioning member may also be formed with a communicating hole for communicating the partitioned spaces with each other. Further, instead of a communicating hole, the partitioning member or cushioning member may be formed in a dimension which allows the formation of a gap with the member which partitions the combustion chamber, and this gap (for example, a gap between the inner peripheral wall of the combustion chamber and the edge portion of the partitioning member) may be used in place of the communicating hole.

The partitioning member is preferably disposed to partition the interior of the combustion chamber in which the partitioning member is disposed in accordance with the amount of each gas generating agent charged in the combustion chamber. In other words, it is desirable that the gas generating agent having the higher combustion temperature and the gas generating agent having the lower combustion temperature can be adjusted optionally in accordance with their respective ignitability, usage amounts, usage proportion, and so on. If it is possible at this time to adjust the volume of the space into which each gas generating agent is to be charged, the gas generating agents can be charged appropriately while preventing mixing of and damage to the gas generating agents caused by vibration when the gas generator is loaded into the vehicle. The partitioning member may be fixed inside the combustion chamber by being inserted therein with force, for example, so that the interior of the combustion chamber can be partitioned freely in accordance with the charging amount of each gas generating agent.

A communicating hole is formed in the partitioning member to communicate the partitioned space with each other. The communicating hole may be formed not to influence the combustion performance of the gas generating agent, or the opening area of the communicating hole (e.g., the total opening area when a plurality of communicating holes are provided) may be associated with the surface area of the gas generating agent so that by adjusting the combustion performance of the gas generating agent disposed in the space on the upstream side of the partitioning member (e.g., the side that is furthest from the gas discharge holes), the internal combustion pressure in the space is adjusted. Further, the communicating hole may be closed by an aluminum tape or the like having a thickness of approximately 50 to 100 µm (i.e., the combined thickness of the adhesive layer and the base portion) which is ruptured by the pressure generated during combustion, or may be covered with a silicon cushion or the like which is burned by the heat generated during combustion.

It is preferable in the present invention that at least one combustion chamber is separated inside the housing according to the ignition means for igniting and burning the gas generating agent charged therein, and at least one type of gas generating agent charged in one of the at least one combustion chamber is ignited and burned by ignition means.

Although the single combustion chamber is partitioned by the partitioning member as described above, the communicating hole is formed in the partitioning member, and, therefore, the spaces in which the different gas generating agents are accommodated may communicate with each other. Furthermore, combustion of the gas generating agents is initiated by the activation of a single igniter, and hence the spaces partitioned by the partitioning member are not individual combustion chambers, but form a single combustion chamber in combination. Therefore, in the present invention, the at least one "combustion chamber" separated in the housing are separated according to the ignition means for igniting and burning the gas generating agents charged therein, and the at least one gas generating agent charged in the at least one combustion chamber is ignited and burned successively by one of the ignition means. Hence, even when the partitioning member is provided in the combustion chamber so that the spaces accommodating the different gas generating agents are partitioned thereby, the gas generating agents are perceived to be disposed together in a single combustion chamber as long as they are burned in succession by the activation of a single igniter. This holds not only for a single-type gas generator, but also for a dual-type gas generator in which two sets of a combustion chamber and a corresponding ignition means are provided, and a multi-type gas generator in which three or more sets are provided.

Particularly, when the gas generator is a dual or multi-type, the two or more types of gas generating agents having different combustion temperatures may be disposed together (e.g., mixed) in all of the combustion chambers provided in the gas generator, or may be disposed together (e.g., mixed) in only one of the combustion chambers.

In the gas generator of the present invention, to ensure that the gas generating agent as a whole is sufficiently ignitable while suppressing the combustion temperature thereof to a low level, the combustion temperature of the gas generating agent having the highest combustion temperature, among the at least two types of gas generating agents having different combustion temperatures, is preferably between 1700 and 3000° C., and the combustion temperature of the gas generating agent having the lowest combustion temperature is preferably between 1000 and 1700° C. Moreover, the gas generating agent having the highest combustion temperature, among the two or more types of gas generating agent charged in the same combustion chamber, preferably generates gas of no less than 1.2 mol/100 g.

When the gas generating agent having the higher combustion temperature and the gas generating agent having the lower combustion temperature are disposed in a single combustion chamber and partitioned by the partitioning member, the gas generating agent having the lower combustion temperature is preferably set at a greater charging ratio. In so doing, the temperature of the gas generated from the gas generating agent as a whole is reduced, enabling reductions in the amount of coolant, and the weight and size of the gas generator. Although the gas generating agents charged in the same combustion chamber have different combustion temperatures, they are still both gas generating agents, and hence the gas generated by the gas generating agent ignited and burned directly by the electric igniter can also be used to inflate the air bag. As a result, the charging amount of the gas generating agent for inflating the air bag can also be reduced.

In the gas generator of the present invention, when a gas generating agent which generates ammonia through combustion is used as the gas generating agent having the higher combustion temperature and a gas generating agent which generates NOx through combustion is used as the gas generating agent having the lower combustion temperature, the respective gases can be converted into nitrogen gas by a reaction of the generated NOx and ammonia. As a result, the amount of NOx discharge can be reduced reliably, and the amount of ammonia discharge can also be reduced.

According to the gas generator of the present invention as described above, the combustion temperature of the gas generating agent in the entire gas generator can be reduced, and hence the coolant filter can be simplified, enabling a reduction in the size of the gas generator. Moreover, since the combustion temperature of the gas generating agent is suppressed to a low level, gas components such as NOx generated during combustion of the gas generating agent can be reduced. In the gas generator of the present invention, the ignitability and combustibility of the gas generating agent can be ensured even though the combustion temperature of the gas generating agent is reduced in this manner, or in other words, even when a gas generating agent that typically has poor ignitability is used, and hence the operational reliability of the gas generator can be ensured. In short, according to the present invention, conventional antithetical technological problems relating to the ignitability and combustibility of a gas generating agent can be solved.

Furthermore, in the gas generator of the present invention, by adjusting the overall charging amount of the gas generating agents having different combustion temperatures that are charged in the same combustion chamber, or the charging proportions thereof, the output of the gas generator can be adjusted easily.

BRIEF DESCRIPTION OF THE DRAWINGS

The present invention will become more fully understood from the detailed description given herein below and the accompanying drawings which are given by way of illustrations only, and thus are not limitative of the present invention, and wherein.

Figure 1:
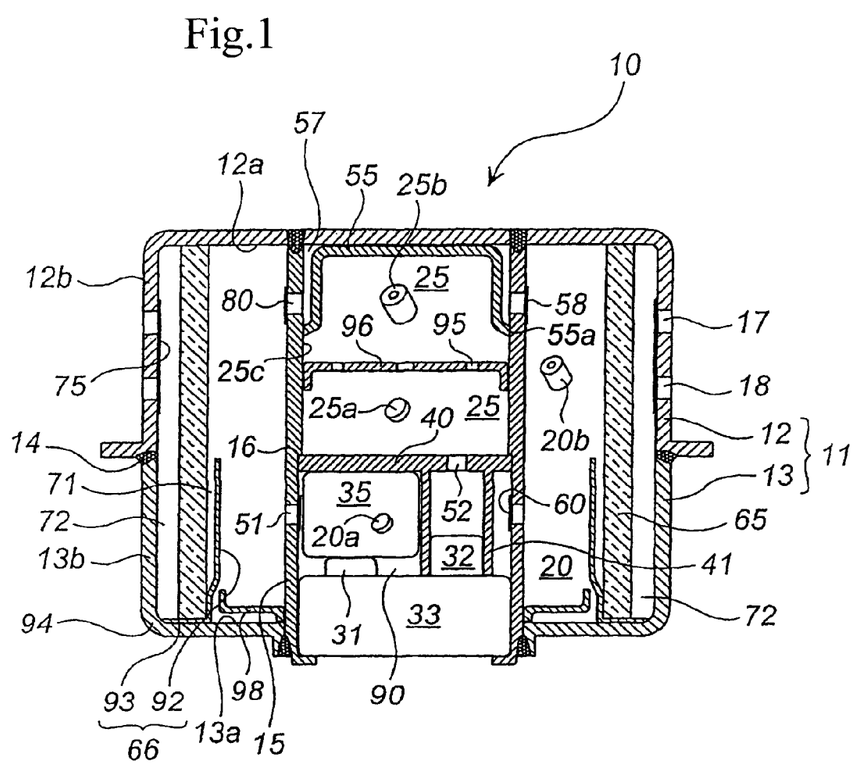
FIG. 1 is an axial sectional view of a gas generator for an air bag.

An embodiment of the present invention will be described below with reference to the drawing. FIG. 1 is an axial sectional view of a gas generator for an air bag of the present embodiment. Note that in the following description, the longitudinal relationship between the terms "upper" and "lower" is based on FIG. 1. Moreover, the axial direction denotes the axial direction of the housing, and the radial direction denotes the radial direction of the housing.

An outer shell container of a gas generator 10 has a housing 11 formed by joining a diffuser shell 12 and a closure shell 13 which defines an internal storage space together with the diffuser shell 12. The diffuser shell 12 and the closure shell 13 are welded at a welding portion 14. The black-shaded parts of FIG. 1 indicate other welding portions.

Gas discharge ports 17, 18 are provided along the circumferential direction of the diffuser shell 12 in a required number, and these gas discharge ports 17, 18 are closed by an aluminum seal tape 75. The gas discharge ports 17 and gas discharge ports 18, arranged in series along the circumferential direction and may have the same or a different diameter.

An inner cylinder 15 having a substantially cylindrical shape is disposed inside the housing 11. The upper peripheral edge of the inner cylinder 15 is joined to a ceiling surface 12a of the diffuser shell 12, and the lower peripheral edge thereof is joined to a base surface 13a of the closure shell 13. As a result, a space isolated from the outside environment is formed inside the housing. At the outside of the inner cylinder 15, and a space (i.e., a part of a first combustion chamber) for accommodating a first gas generating agent 20b, described below, is provided. A single collar 33, to which a first igniter 31 and a second igniter 32 are fixed, is provided in the lower side opening of the inner cylinder 15, thereby closing the interior of the inner cylinder 15. Note that in cases where an air bag module including the gas generator 10 is installed in a vehicle, the first igniter 31 and the second igniter 32 are connected to a device (and a power source) for controlling operations of the gas generator via a connector, lead wires, and so on.

A partition wall 40 is provided in the inner cylinder 15 for dividing the space in the interior of the inner cylinder 15 into upper and lower sections. The partition wall 40 has a flat circular shape comprising a skirt portion 41, which surrounds the periphery of the second igniter 32, and a second through hole 52 formed in a part surrounded by the skirt portion. The partition wall is fitted into a stepped notch portion 16 of the inner cylinder 15 from the lower side. Since the partition wall 40 engages the stepped notch portion 16 of the inner cylinder 15 as described above, it is prevented from moving upward by the pressure generated even when the first igniter 31 is activated. Moreover, since the inner diameter of the skirt portion 41 is set to be substantially identical to the outer diameter of the ignition part of the igniter 32 such that the skirt portion 41 surrounds the ignition part in an airtight fashion, the flame generated by an activation of the second igniter 32 advances only in the direction of the second through hole 52.

The first igniter 31 and a first gas generating agent 20a charged in an aluminum cup 35 are disposed in a space outside of the skirt portion 41 (i.e., the space separated by the skirt portion 41 from the space in which the second igniter 32 exists) in the lower space inside the inner cylinder 15 partitioned by the partition wall 40 (i.e., the space closed by the collar 33). Hence in the gas generator according to this embodiment, the first gas generating agent 20a, which is disposed in the same space as the first igniter 31, and the first gas generating agent 20b, which is disposed in the separated space on the outside of the inner cylinder 15 in the radial direction, are used as first gas generating agents.

The two first gas generating agents 20a, 20b have different combustion temperatures. The first gas generating agent 20a, disposed in the same space as the first igniter 31 has a higher a high combustion temperature, and the first gas generating agent 20b disposed in the separated space outside the inner cylinder 15 in the radial direction has a lower combustion temperature. Further, the first gas generating agent 20a having a higher combustion temperature is non-perforated, and its dimensions (e.g., diameter, length) per particle are smaller than those of the first gas generating agent 20b having a lower combustion temperature, whereas the first gas generating agent 20b having a lower combustion temperature has a single-perforated cylindrical form. Note, however, that there are no particular limitations as to the form of the first and second gas generating agents that may be used in the gas generator, and a disk-form having a through hole or a hollow (e.g., having a recessed portion), a columnar form having a through hole or a hollow (e.g., having a recessed portion), and so on may be employed. Moreover, the gas generating agent having the higher combustion temperature may take the same form as the gas generating agent having the lower combustion temperature.

The space outside the inner cylinder 15 in the redial direction, in which the first gas generating agent 20b having a lower combustion temperature is accommodated, and the space accommodating the first gas generating agent 20a having a higher combustion temperature, in which the first igniter 31 is disposed, are connected by a first through hole 51. Since the gas generating agents 20a and 20b in these two spaces are ignited and burned successively by an activation of the first igniter 31, the two combined spaces serves as a single combustion chamber (i.e., a first combustion chamber 20). Thus the first gas generating agents 20a and 20b having different combustion temperatures are charged in the same combustion chamber (i.e., the first combustion chamber 20).

By disposing the partition wall 40 having the skirt portion 41 in the inner cylinder 15, a second combustion chamber 25 is separated from the two igniters, and the first igniter 31 is separated from the second igniter 32. As a result, the ignition energy (e.g., a flame, combustion gas, and so on) generated by an activation of the first igniter 31 flows exclusively into the first combustion chamber, is prevented from infiltrating the second ignition means chamber, and passes through the second through hole 52 into the second combustion chamber 25.

The gas generating agent 20a charged in an aluminum cup 35 is positioned directly above the first igniter 31, and the first through hole 51 provided in a lower portion of a side wall of the inner cylinder 15 is positioned substantially directly opposing the center of the aluminum cup 35. This position does not directly face the direction of advancement of the flame generated by an activation of the first igniter 31. Note that aluminum or stainless steel seal tape 60 is adhered to the first through hole 51 from the inside.

By disposing the first through hole 51 and the aluminum cup 35, accommodating the gas generating agent 20a, face one another directly in this manner, all of the gas generating agent 20a is burned substantially evenly by an activation of the first igniter 31.

Further, the first through hole 51 is provided in the lower portion of the inner cylinder 15, and a shielding plate 66 is provided at a position directly facing the first through hole 51 in the space in which the first gas generating agent 20b is provided and inside a cylindrical filter 65 provided facing the peripheral wall surface of the housing. The shielding plate 66 of this embodiment has a tube portion 92 and an outward flange-shaped circular portion 93 formed integrally with and extending from one side (i.e., the lower side in FIG. 1) of the tube portion 92. The shielding plate 66 is formed such that the circular portion 93 contacts the base surface 13a and the tube portion 92 covers a predetermined range of the lower portion of the cylindrical filter 65 (e.g., a height range of approximately ½ to ⅔ of the entire height of the cylindrical filter 65).

By providing this shielding plate 66, the high-temperature gas and flame generated by combustion of the first gas generating agent 20a (e.g., the energy generated by combustion of the gas generating agent 20a) are ejected through the first through hole 51 and collide with the shielding plate 66 (the tube portion 92 in particular) such that the advancement direction of the energy is changed from the radial direction to an upward axial direction. The energy thus advances toward the space in which the first gas generating agent 20b is provided. As a result, the overall ignitability of the first gas generating agent 20b is improved. It is therefore preferable that the axial length of the shielding plate 66 be extended upward at least beyond the first through hole 51. Note that the same actions and effects as those illustrated in FIG. 1 can be obtained by providing a shielding plate so as to cover the entire inner peripheral surface of the filter 65 and forming a plurality of gas vents in part thereof. Moreover, a shielding plate (not shown) similar to the shielding plate 66, comprising the tube portion 92 and a circular portion formed integrally with and extending from one side (i.e., the lower side in FIG. 1) of the tube portion 92 to cover the outer periphery of the filter 65, may be provided on the outside of the filter 65.

The shielding plate 66 may be positioned in relation to the housing by bringing the outer peripheral edge portion of the circular portion 93 into contact with a curved portion 94 of the housing. Filter positioning during assembly may be performed by bringing the inner peripheral surface of the filter 65 into contact with the lower-side outer peripheral surface of the tube portion 92. The tube portion 92 is formed and disposed to secure an annular gap 71 between the tube portion 92 and the inner peripheral surface of the filter 65. In so doing, combustion gas (in other words, gas for inflating the air bag generated by combustion of the gas generating agent) also enters the gap 71, enabling an improvement in the filtering efficiency and cooling efficiency.

By means of the structure or configuration at the side of the first combustion chamber 20 provided in the housing 11 as described above, all of the first gas generating agent 20a having a higher combustion temperature that is charged into the aluminum cup 35 burns quickly and evenly when the first igniter 31 is activated. The resulting flame ruptures the seal tape 60 to flow through the first through hole 51 in the lower portion of the side wall of the inner cylinder 15 into the space on the outside of the inner cylinder 15 of the same first combustion chamber, in which the first gas generating agent 20b having a lower combustion temperature is charged. The flame is then directed throughout the entire space by the shielding plate 66 so that the first gas generating agent 20b having a lower combustion temperature is ignited and burned. The first gas generating agent 20b having a lower combustion temperature typically has poor ignitability, but since the first gas generating agent 20a having favorable ignitability burns sufficiently and over a long period of time, even the first gas generating agent 20b having a lower combustion temperature can be ignited and burned quickly and reliably. Moreover, the combustion heat generated in the first combustion chamber from the first gas generating agent as a whole is reduced in accordance with the amount of the first gas generating agent 20b having a lower combustion temperature that is used.

The space above the partition wall 40 insider the inner cylinder 15 is formed as the second combustion chamber 25, and a second gas generating agent 25a and a second gas generating agent 25b having different combustion temperatures are accommodated in the second combustion chamber 25. In this embodiment, the second gas generating agent 25a having a higher combustion temperature is charged on the side of the second combustion chamber 25 in which the partition wall 40 is provided (i.e., the lower side), and the second gas generating agent 25b having a lower combustion temperature is charged above the partition wall 40. The two types of second gas generating agents 25a and 25b having different combustion temperatures are charged in the same second combustion chamber 25, and are partitioned according to type by a partitioning member, or in other words a partition plate 96, having a communicating hole 95. The communicating hole 95 may be closed by a seal tape, not shown in the drawing. The partition plate 96 is inserted forcibly into the inner cylinder 15 from below, and the seal tape 60 is preferably adhered to the partition plate 96 after insertion of the partition plate so that the tape does not rupture during the insertion.

The space accommodating the second gas generating agent 25a having a higher combustion temperature and the space accommodating the second gas generating agent 25b having a lower combustion temperature are connected by the communicating hole 95, and since the gas generating agents provided in these two spaces are ignited and burned successively by an activation of the second igniter 32, the two combined spaces form a single combustion chamber (i.e., the second combustion chamber 25). Therefore, the second gas generating agents 25a and 25b having different combustion temperatures are charged inside the same combustion chamber (i.e., the second combustion chamber 25).

Particularly in this embodiment, the second gas generating agent is similar to the first gas generating agent in that the second gas generating agent 25a having a higher combustion temperature is non-perforated, and its dimensions (e.g., diameter, length) per particle are smaller than those of the second gas generating agent 25b having a lower combustion temperature, whereas the second gas generating agent 25b having a lower combustion temperature has a single-perforated cylindrical form. The two gas generating agents are disposed to be ignited (or inflamed) by the igniter 32 in order of the second gas generating agent 25a and then the second gas generating agent 25b.

The partition plate 96 is inserted forcibly into the second combustion chamber 25 such that the disposal location thereof can be adjusted optionally. Accordingly, the second gas generating agents 25a, 25b can be charged at an arbitrary mixture ratio. In this embodiment, the charging amount of the gas generating agent 25b having a lower combustion temperature is greater than that of the gas generating agent 25a having a higher combustion temperature, and hence the overall combustion temperature of the second combustion chamber 25 is suppressed to a low level.

Further, since the disposal location of the partition plate 96 can be adjusted optionally, the charging ratio of the second gas generating agents 25a, 25b having different combustion temperatures can also be adjusted optionally. Accordingly, the temperature of the gas generated from the second combustion chamber can be adjusted as desired, enabling the output of the gas generator to be adjusted. By increasing the charging amount of the gas generating agent having a lower combustion temperature, the overall temperature of the gas generated from the second combustion chamber decreases, enabling a reduction in an amount of the filter 65. As a result, the overall size and weight of the gas generator can be reduced.

Further, the second gas generating agent 25b has a lower combustion temperature than the second gas generating agent 25a, and therefore typically exhibits poor ignitability. In the gas generator shown in FIG. 1, however, the second gas generating agent 25a having a higher combustion temperature is ignited and burned first by the second igniter 32, and thus sufficient ignition energy is supplied to the second gas generating agent 25b having a lower combustion temperature. As a result, the combustibility of the second gas generating agent accommodated inside the second combustion chamber 25 is improved.

Since boron nitre ($B/KNO_3$), which is used conventionally as a transfer charge, is employed in a powder form and burns out instantaneously, it is difficult to supply the second gas generating agent 25b having a lower combustion temperature with sufficient ignition energy. In the gas generator according to the present invention, however, the second gas generating agent 25b can be supplied with sufficient ignition energy for a comparatively long period of time through combustion of the second gas generating agent 25a having a higher combustion temperature, which is extremely beneficial in ensuring that the second gas generating agent 25b is ignited and burned reliably. Use of the second gas generating agent 25a is also beneficial in that gas for inflating the air bag can also be supplied.

Note that in this embodiment, the gas generating agents 25a, 25b are separated by the partition plate 96. However, the gas generating agents 25a, 25b may be mixed evenly and disposed in the second combustion chamber without using the partition plate 96, or the gas generating agents 25a, 25b may be localized as shown in FIG. 1, without using the partition plate 96. Note, however, that the partition plate 96 formed with the communicating hole 95 is preferably used to adjust the combustion performance of the gas generating agents 25a, 25b. The reason for this is that by adjusting the overall opening area of the communicating hole 95 in relation to the entire surface area of the gas generating agent 25a, the combustion performance of the gas generating agent 25a can be adjusted. Meanwhile, by adjusting the total opening area of a communicating hole 80, that communicates the first combustion chamber 20 with the second combustion chamber, in relation to the overall surface area of the gas generating agent 25b, the combustion performance of the gas generating agent 25b can be adjusted. Note that when the gas generating agent does not require combustion performance adjustment according to the characteristics thereof, then naturally there is no need to adjust the combustion performance of the gas generating agent using the communicating holes in the partition plate. In this case, the two types of gas generating agents can be distributed unevenly or mixed by increasing the size of the communicating holes or removing the partition plate itself.

A cylindrical retainer 55 having a bottom is fitted into the second combustion chamber 25 with the opening portion side thereof facing downward, and fixed to the second combustion chamber 25 by being pressed against an inner wall 25c thereof at a side wall tip end portion 55a. The retainer 55 may be formed with a plurality of openings (e.g., nozzles) in its side wall portions, or the entire retainer 55 may be formed of a porous material such as wire mesh, so that it has substantially no pressure loss. The retainer 55 is disposed to form a gap 57 large enough to secure a gas passage between its side wall and the inner wall 25c of the second combustion chamber 25.

As a result, the gas generating agent 25b does not make contact with the communicating hole 80, and hence the communicating hole 80 is not blocked by the unburned gas generating agent 25b in the vicinity of the communicating hole 80. If the communicating hole 80 were blocked by the second gas generating agent, the internal pressure of the second combustion chamber 25 would rise excessively during the initial stage of combustion, and when the second gas generating agent blocking the communicating hole 80 was burned, the internal pressure would drop dramatically as the communicating hole 80 opened, leading to a possible reduction in the combustion stability. In the gas generator of this embodiment, however, the communicating hole 80 is not blocked by the unburned gas generating agent 25b, and hence such a problem can be eliminated. A similar member may be employed to form a gap between the gas generating agent 25a and the communicating hole 95 formed in the partition plate 96.

The communicating hole 80 is closed by a stainless steel seal tape 58 from the outside. Characteristics such as the material, thickness, and closing constitution or configuration of this seal tape are selected such that the communicating hole 80 is opened only when the second gas generating agents 25a and 25b are burned, and not when the first gas generating agents 20a and 20b are burned.

Note that the charging ratio of the gas generating agents 20b, 20a having different burning rates in the first combustion chamber 20 can also be adjusted. To illustrate an example of such an aspect on the basis of FIG. 1, a retainer 98 for retaining the gas generating agent 20b having a lower combustion temperature may be disposed near the center of the housing axial direction, for example, whereupon the gas generating agent 20b having a lower combustion temperature and the gas generating agent 20a having a higher combustion temperature may be disposed at the diffuser 12 side and the closure 13 side, respectively. At this time, the first gas generating agent 20a having a higher combustion temperature is also disposed in a space 90 of the first combustion chamber in which the second igniter is accommodated. By forming the retainer 98 so that it can be inserted forcibly, the charging ratio of the two first gas generating agents can be adjusted optionally. However, as mentioned in the description relating to the second combustion chamber, the charging amount of the gas generating agent having a lower combustion temperature is preferably increased in the first combustion chamber so that the weight of the coolant and the size of the gas generator can be reduced.

In a dual type gas generator in which two combustion chambers are provided within a housing, as in the gas generator described above with reference to FIG. 1, adjustment of the charging ratio of the two types of gas generating agents that are charged into the same combustion chamber may be performed in either of the first combustion chamber or second combustion chamber, or in both combustion chambers.

In the gas generator according to this embodiment, a gas generating agent having a combustion temperature of 1700 to 3000° C., for example, may be used as the gas generating agents 20a, 25a having a higher combustion temperature, disposed in the first combustion chamber and second combustion chamber, respectively. An example of such a gas generating agent is a gas generating agent having nitroguanidine as a fuel and strontium nitrate as an oxidizer. Where necessary, a binder (e.g., sodium carboxymethylcellulose) and a residue collecting agent (e.g., Japanese acid clay) may be used.

The following composition, for example, may be used for the first and second gas generating agents having a higher combustion temperature:

(a) nitroguanidine of approximately 25 to 55% by mass, or preferably 30 to 40% by mass;

(b) strontium nitrate of approximately 40 to 65% by mass, or preferably 45 to 65% by mass;

(c) Japanese acid clay of approximately 1 to 20% by mass, or preferably 3 to 7% by mass; and (d) a binder of approximately 3 to 12% by mass, or preferably 4 to 12% by mass.

The first and second gas generating agents having a higher combustion temperature are formed in a pellet form with an outer diameter of 0.8 to 4.0 mm and a length of 0.8 to 4.0 mm, or may be formed in a single-perforated cylindrical form having an outer diameter of 1.2 to 6.0 mm and a length of 0.8 to 6.0 mm, and a through hole with an inner diameter of 0.5 to 2.0 mm.

Further, a gas generating agent disclosed in JP-B No. 3247929 may be used as the first and second gas generating agents having a higher combustion temperature. The gas generating agents shown in the following Table 1, for example, are included as this gas generating agent.

TABLE 1

Examples of First & Second Gas Generating Agent with High Combustion Temperature

| | Gas Generating Composition(Composition ratio: wt %) | Combustion Temperature(° C.) | Gas Output (mol/100 g) |
|---|---|---|---|
| Example 1-1 | Nitroguanidine/KNO$_3$ (56.3/43.7) | 1927 | not less than 1.2 |
| Example 1-2 | Nitroguanidine/Sr(NO$_3$)$_2$/CuO (40.3/19.2/40.5) | 1818 | not less than 1.2 |
| Example 1-3 | Nitroguanidine/CuO (39.5/60.5) | 1770 | 1.90 |
| Example 1-4 | Nitroguanidine/KNO$_3$/Al$_2$O$_3$ (55.2/42.8/2.0) | 1899 | not less than 1.2 |
| Example 1-5 | Zn(5-AT)$_2$/Sr(NO$_3$)$_2$ (44.0/56.0) | 2138 | not less than 1.2 |
| Example 1-6 | [Cu(5-AT)$_{2.1}$/2H$_2$O]/Sr(NO$_3$)$_2$ (42/58) | 2117 | not less than 1.2 |
| Example 1-7 | Triaminoguanidine Nitrate/KClO$_4$ (57.9/42.1) | 2638 | not less than 1.2 |
| Example 1-8 | Carbohydrazide/KClO$_4$/CaO (39/61/10) | 2552 | not less than 1.2 |
| Example 1-9 | Cellulose Acetate/Triacetin/KClO$_4$/Nitroguanidine (8/2/55/35) | 2561 | not less than 1.2 |

TABLE 1-continued

Examples of First & Second Gas Generating Agent with High Combustion Temperature

| | Gas Generating Composition(Composition ratio: wt %) | Combustion Temperature(° C.) | Gas Output (mol/100 g) |
|---|---|---|---|
| Example 1-10 | Cellulose Acetate/Triacetin/KClO$_4$/Triaminoguanidine Nitrate (8/4/57/31) | 2620 | not less than 1.2 |
| Example 1-11 | Cellulose Acetate/Triacetin/KClO$_4$/5-Aminotetrazole (10/5/65/20) | 2655 | not less than 1.2 |
| Example 1-12 | Nitroguanidine/CuO (38/62) | 1719 | 1.83 |

Meanwhile, a gas generating agent having a combustion temperature of 1000 to 1700° C., for example, may be used as the gas generating agents 20b, 25b having a lower combustion temperature, disposed in the first combustion chamber and second combustion chamber, respectively. An example of such a gas generating agent is a gas generating agent having guanidine nitrate as a fuel and a basic copper oxide as an oxidizer. Where necessary, the aforementioned binder and residue collecting agent, or a substance containing a coolant (e.g., aluminum hydroxide), may be used.

A composition containing the following components (a) to (c), for example, may be used for the first and second gas generating agents having a lower combustion temperature:

(a) an organic compound serving as a fuel of preferably 5 to 60% by mass, more preferably 10 to 60% by mass, and even more preferably 10 to 55% by mass;

(b) an oxygen-containing oxidizer component of 10 to 85% by mass, wherein a preferred aspect of the (b) component is (b-1) an oxidizer (at least one oxidizer selected from a basic metal nitrate, a nitrate, and ammonium nitrate) of preferably 10 to 85% by mass, more preferably 20 to 70%, and even more preferably 30 to 60% by mass, and (b-2) an oxidizer (at least one oxidizer selected from a perchlorate and a chlorate) of preferably 0.5 to 20% by mass, more preferably 1 to 10% by mass, and even more preferably 1 to 5% by mass; and (c) aluminum hydroxide of preferably 0.1 to 20% by mass, more preferably 3 to 15% by mass, and even more preferably 4 to 10% by mass.

The following compositions, for example, may be used as this gas generating agent.

COMPOSITION EXAMPLE 1

(a) guanidine nitrate of 30 to 60% by mass
(b) a basic copper nitrate of 30 to 60% by mass
(c) aluminum hydroxide of 3 to 10% by mass

COMPOSITION EXAMPLE 2

(a) guanidine nitrate or melamine
(b-1) a basic copper nitrate
(b-2) at least one perchlorate selected from sodium perchlorate, potassium perchlorate, and ammonium perchlorate
(c) aluminum hydroxide

COMPOSITION EXAMPLE 3

(a) guanidine nitrate or melamine
(b-1) a basic copper nitrate
(b-2) sodium perchlorate or potassium perchlorate
(c) aluminum hydroxide A composition in which one or both of the following (d) component and (e) component is blended with the aforementioned (a) to (c) components may also be used:

(d) a binder of preferably no more than 20% by mass, more preferably 0.5 to 10% by mass, and even more preferably 1 to 7% by mass; and (e) an additive selected from a metal oxide and a metal carbonate of preferably no more than 20% by mass, more preferably 1 to 15% by mass, and even more preferably 3 to 10% by mass.

The following compositions, for example, may be used as this gas generating agent.

COMPOSITION EXAMPLE 4

(a) nitroguanidine
(b) a basic copper nitrate
(c) aluminum hydroxide
(d) guar gum

COMPOSITION EXAMPLE 5

(a) melanine
(b) a basic copper nitrate
(c) aluminum hydroxide
(d) sodium carboxymethylcellulose or guar gum

COMPOSITION EXAMPLE 6

(a) guanidine nitrate
(b) a basic copper nitrate
(c) aluminum hydroxide
(d) sodium carboxymethylcellulose or guar gum The first and second gas generating agents having a lower combustion temperature may be formed in a single-perforated cylindrical form having an outer diameter of 1.2 to 6.0 mm and a length of 0.8 to 6.0 mm, and having a through hole having an inner diameter of 0.5 to 2.0 mm.

The gas generating agents shown below in Table 2 may be used as the first and second gas generating agents with a low combustion temperature.

TABLE 2

Examples of First and Second Gas Generating Agents With Low Combustion Temperature

| | Gas Generating Composition (Composition ratio: wt %) | Combustion Temperature (° C.) | Gas Output (mol/ 100 g) |
|---|---|---|---|
| Example 2-1 | NQ/BCN/Al(OH)$_3$ (43.9/41.1/15) | 1579 | 2.74 |

TABLE 2-continued

Examples of First and Second Gas Generating Agents With Low Combustion Temperature

| | Gas Generating Composition (Composition ratio: wt %) | Combustion Temperature (° C.) | Gas Output (mol/100 g) |
|---|---|---|---|
| Example 2-2 | GN/BCN (53.4/46.6) | 1638 | 3.01 |
| Example 2-3 | GN/BCN/Al(OH)$_3$ (52.8/42.2/5) | 1346 | 3.04 |
| Example 2-4 | GN/BCN/Al(OH)$_3$ (50.2/39.8/10) | 1254 | 2.99 |
| Example 2-5 | GN/BCN/Al(OH)$_3$ (47.5/37.5/15) | 1146 | 2.94 |
| Example 2-6 | Melamine/BCN (20.8/79.2) | 1230 | 2.14 |
| Example 2-7 | Melamine/BCN/Al(OH)$_3$ (20.6/74.4/5) | 1085 | 2.19 |
| Example 2-8 | Melamine/BCN/Al(OH)$_3$ (19.5/70.5/10) | 1009 | 2.17 |
| Example 2-9 | Melamine/BCN/Al(OH)$_3$ (18.5/66.5/15) | 891 | 2.16 |
| Example 2-10 | NQ/BCN/Al(OH)$_3$/Guar Gum (37.0/53.0/5/5) | 1677 | 2.64 |
| Example 2-11 | NQ/BCN/Al(OH)$_3$/Guar Gum (34.5/50.5/10/5) | 1533 | 2.6 |
| Example 2-12 | NQ/BCN/Al(OH)$_3$/Guar Gum (32.0/48.0/15/5) | 1390 | 2.55 |
| Example 2-13 | GN/BCN/Guar Gum (42.7/52.3/5) | 1405 | 2.86 |
| Example 2-14 | GN/BCN/Al(OH)$_3$/Guar Gum (40.0/50.0/5/5) | 1291 | 2.80 |
| Example 2-15 | GN/BCN/Al(OH)$_3$/Guar Gum (37.3/47.7/10/5) | 1178 | 2.75 |
| Example 2-16 | GN/BCN/Al(OH)$_3$/Guar Gum (34.7/45.3/15/5) | 1085 | 2.70 |
| Example 2-17 | Melamine/BCN/Al(OH)$_3$/CMCNa (17.8/74.2/5/3) | 1085 | 2.15 |
| Example 2-18 | Melamine/BCN/Al(OH)$_3$/CMCNa (16.7/70.3/10/3) | 1019 | 2.14 |
| Example 2-19 | Melamine/BCN/Al(OH)$_3$/CMCNa (15.7/66.3/15/3) | 904 | 2.13 |
| Example 2-20 | Melamine/BCN/Al(OH)$_3$/Guar Gum (17.5/74.5/5/3) | 1085 | 2.16 |
| Example 2-21 | Melamine/BCN/Al(OH)$_3$/Guar Gum (16.4/70.6/10/3) | 1008 | 2.15 |
| Example 2-22 | Melamine/BCN/Al(OH)$_3$/Guar Gum (15.4/66.6/15/3) | 893 | 2.14 |
| Example 2-23 | GN/BCN (53.4/46.6) | 1638 | 3.01 |
| Example 2-24 | GN/BCN/Al(OH)$_3$/NH$_4$ClO$_4$ (50.0/35.0/10/5) | 1497 | 3.07 |
| Example 2-25 | GN/BCN/Al(OH)$_3$/KClO$_4$ (51.09/33.91/10/5) | 1483 | 3.02 |
| Example 2-26 | GN/BCN/Al(OH)$_3$/NaClO$_4$ (51.63/33.37/10/5) | 1206 | 3.14 |
| Example 2-27 | GN/BCN/Al(OH)$_3$/NaClO$_3$ (50.99/34.01/10/5) | 1483 | 3.01 |
| Example 2-28 | GN/BCN/Al(OH)$_3$/KClO$_3$ (50.46/34.54/10/5) | 1462 | 2.99 |
| Example 2-29 | GN/BCN/Al(OH)$_3$/NH$_4$ClO$_4$/CMCNa (38.4/41.6/10/5/5) | 1421 | 2.85 |
| Example 2-30 | GN/BCN/Al(OH)$_3$/KClO$_4$/CMCNa (39.48/40.52/10/5/5) | 1407 | 2.78 |
| Example 2-31 | GN/BCN/Al(OH)$_3$/NaClO$_4$/CMCNa (39.03/43.47/10/2.5/5) | 1372 | 2.77 |
| Example 2-32 | GN/BCN/Al(OH)$_3$/NaClO$_4$/CMCNa (40.03/39.97/10/5/5) | 1441 | 2.80 |
| Example 2-33 | GN/BCN/Al(OH)$_3$/NaClO$_4$/CMCNa (41.02/36.48/10/7.5/5) | 1505 | 2.83 |
| Example 2-34 | GN/BCN/Al(OH)$_3$/NaClO$_3$/CMCNa (38.86/41.14/10/5/5) | 1422 | 2.77 |
| Example 2-35 | GN/BCN/Al(OH)$_3$/KClO$_3$/CMCNa (39.39/40.16/10/5/5) | 1392 | 2.75 |
| Example 2-36 | Melamine/BCN (20.8/79.2) | 1230 | 2.14 |
| Example 2-37 | Melamine/BCN/Al(OH)$_3$KClO$_4$/CMCNa (14.96/65.04/10/5/5) | 1125 | 2.20 |
| Example 2-38 | Melamine/BCN/Al(OH)$_3$/NH$_4$ClO$_4$/CMCNa (15.38/64.62/10/5/5) | 1114 | 2.11 |
| Example 2-39 | Melamine/BCN/Al(OH)$_3$/NaClO$_4$/CMCNa (15.59/64.41/10/5/5) | 1142 | 2.13 |
| Example 2-40 | Melamine/BCN/Al(OH)$_3$/NaClO$_3$/CMCNa (15.34/64.66/10/5/5) | 1097 | 2.10 |
| Example 2-41 | Melamine/BCN/Al(OH)$_3$/KClO$_3$/CMCNa (15.14/64.86/10/5/5) | 1121 | 2.11 |
| Example 2-42 | BHTNH$_3$/BCN (28.75/71.25) | 1562 | 2.43 |
| Example 2-43 | BHTK/BCN (44.52/55.48) | 1616 | 1.54 |
| Example 2-44 | BHTNH$_3$/BCN/CMCNa (24.9/72.1/3.0) | 1512 | 2.36 |
| Example 2-45 | BHTNH$_3$/BCN/CMCNa (22.33/72.67/5) | 1491 | 2.32 |
| Example 2-46 | BHTNH$_3$/BCN/CMCNa (19.77/73.23/7) | 1470 | 2.28 |
| Example 2-47 | BHTNH$_3$/BCN/CMCNa/Fe$_2$O$_3$ (25.38/69.72/2.94/1.96) | 1459 | 2.38 |
| Example 2-48 | BHTNH$_3$/BCN/Cellulose Acetate (22.79/74.21/3) | 1497 | 2.28 |
| Example 2-49 | Zn(5-AT)$_2$/BCN (40/60) | 1605 | 2.04 |
| Example 2-50 | Zn(5-AT)$_2$/BCN/CMCNa (35/62/3) | 1546 | 2.03 |

In Table 2, GN denotes guanidine nitrate, NQ denotes nitroguanidine, BCN denotes a basic copper nitrate (Cu$_2$(NO$_3$)(OH)$_3$) CMCNa denotes sodium carboxylmethylcellulose, and BHTH$_3$ denotes a bitetrazole ammonium salt. The average particle diameter of the basic copper nitrate in Table 1 is 4.7 μm, and the average particle diameter of the aluminum hydroxide is 11 μm.

The first and second gas generating agents having a lower combustion temperature preferably contain the following (a) to (c) components, and also aluminum hydroxide serving as a coolant of 0.1 to 20% by mass, preferably 3 to 15% by mass, and more preferably 4 to 10% by mass:

(a) guanidine nitrate serving as a fuel of 5 to 60% by mass, preferably 10 to 60% by mass, and more preferably 10 to 55% by mass;

(b) a basic copper nitrate serving as an oxidizer of 10 to 85% by mass, preferably 20 to 70% by mass, and more preferably 30 to 60% by mass; and (c) sodium carboxymethylcellulose serving as a binder of no more than 20% by mass, preferably 1 to 15% by mass, and more preferably 3 to 10% by mass.

The respective gas generating agents may be used in the following usage amounts (and the usage proportions corresponding to the usage amounts), for example:

first gas generating agent with the higher combustion temperature: 0.5 to 15 g, preferably 1 to 15 g, and more preferably 1.5 to 15 g;

first gas generating agent with the lower combustion temperature: 3 to 15 g, preferably 7 to 150 g, and more preferably 12 to 150 g;

second gas generating agent with the higher combustion temperature: 0.5 to 15 g, preferably 1 to 15 g, and more preferably 1.5 to 15 g; and second gas generating agent with the lower combustion temperature: 1 to 50 g, preferably 2 to 50 g, and more preferably 3 to 50 g.

In the gas generator of this embodiment, constituted as described above, the gas generating agents 20b, 25b having a lower combustion temperature are used in the first combustion chamber and second combustion chamber, respectively, and hence the temperature of the gas generated in each combustion chamber, and also the temperature of the gas that is generated throughout the entire gas generator, can be reduced dramatically in comparison with a case in which only gas generating agents with a high combustion temperature are used. As a result, NOx generation during combustion of the gas generating agents can be reduced, and the filter 65 for purifying and/or cooling the combustion gas prior to be discharged from the gas generator can be simplified.

In other words, in the gas generator shown in FIG. 1, the cylindrical filter 65 is disposed between the first combustion chamber 20 and the peripheral wall of the housing 11 (i.e., a diffuser shell peripheral wall 12b and a closure shell peripheral wall 13b) in order to remove combustion residue from the combustion gas and cool the combustion gas, but since the temperature of the gas generated throughout the entire gas generator is suppressed to a low level, the filter 65 can be simplified, for example having a greater porosity. Note that the filter 65 is disposed such that a gap 72 is formed between the filter 65 and the peripheral wall of the housing 11.

Examples of the simplified cylindrical filter 65 include a filter formed from thin metal wire (e.g., an iron wire or the like) with a wire diameter of approximately 0.3 to 1.2 mm, wound into cylindrical form, a filter formed by winding plan woven thin metal wire into multiple layers, and then subjecting this to compression molding, a filter formed by winding one or a combination of plain woven wire mesh, plain dutch woven wire mesh, or twilled dutch woven wire mesh with a wire diameter of approximately 0.3 to 0.8 mm, and a filter formed by inserting ceramic fiber or metal fiber between these wire meshes.

The structure of the cylindrical filter is to be selected appropriately in accordance with the type of gas generating agent in use, the usage amount, differences in the usage proportion of gas generating agents having different combustion temperatures, or in other words the combustion temperature range, and the amount of combustion residue that is produced. For example, when a gas generating agent having a lower combustion temperature (e.g., approximately 1000 to 1700° C.) which produces little combustion residue is used, a cylindrical filter having a bulk density of 1 to 5 g/cm$^3$ or preferably 2 to 3 g/cm$^3$, and a thickness of 3 to 10 mm or preferably 3 to 6 mm, may be used.

The shielding plate 66 is disposed on the inside of the cylindrical filter 65, and the aforementioned gap (first gap 71) is provided between the cylindrical filter 65 and the tubular shielding plate 66 on the inside thereof. Instead of this gap 71, however, part of the cylindrical filter 65 which makes contact with the shielding plate 66 (this part having approximately the same width as the gap) may be formed as a rarefied structure having a large porosity, which in actuality is an identical state to that in which the gap is provided. The rarefied structure relates to the remaining dense structure having a small porosity in such a manner that when the bulk density of the dense structure is within the range described above, the bulk density of the rarefied structure can be set at 0.1 to 11.0 g/cm$^3$. The width of the gap 71 or the rarefied structure portion secured between the cylindrical filter 65 and the shielding plate 66 is preferably between 0.5 and 3 mm, and more preferably between 1 and 2 mm.

By providing the shielding plate 66 covering the inside of the cylindrical filter 65 and also a shielding plate (not shown) covering the outside of the filter, the combustion gas filtering (e.g., combustion residue filtering) and cooling effects can be further improved.

Note that the seal tape 75 closing the gas discharge holes 17, 18 may be set to rupture simultaneously or separately according to the activation condition of the igniters (whether only one of the igniters is activated, both are activated simultaneously, or the two igniters are activated at a time difference).

Next, an operation of the gas generator 10 for an air bag, performed when the two igniters are activated with a time difference, will be described by referring to FIG. 1.

When the first igniter 31 is activated, the first gas generating agent 20a having a higher combustion temperature is ignited and burned, producing a gas (having energy to ignite unburned gas generating agents) which ruptures the seal tape 60. The gas then passes through the first through hole 51 provided in the peripheral wall of the inner cylinder 15, and is thus discharged into the space outside the inner cylinder 15 in the same first combustion chamber 20.

The gas ejected through the first through hole 51 collides with the shielding plate 66 that opposes the first through hole 51, such that the advancement direction of the gas changed to an upward direction, and thus the first gas generating agent 20b having a lower combustion temperature, which exists downstream with respect to the advancement direction, is ignited and burned. In other words, the shielding plate 66 changes the advancement direction of the gas from a radial direction to an axial direction, such that the gas is supplied to the gas generating agent existing in both the radial direction and the axial direction. As a result, the ignitability and combustibility of all of the first gas generating agent in the first combustion chamber 20 are improved.

If the shielding plate 66 was not provided, the gas ejected through the first through hole 51 to the outside in the radial direction would be supplied sufficiently to the first gas generating agent 20b existing in the ejecting direction, but would be unlikely to reach the first gas generating agent 20b existing above the first through hole 51. This problem is particularly striking when a gas generating agent having a poor ignitability is used. When the shielding plate 66 is used together with the filter 65 in the manner described in this embodiment, however, problems relating to the transmission efficiency of the gas can be solved. Moreover, when the shielding plate 66 is used, the gas collides with only part of the cylindrical filter 65, thus preventing damage to the cylindrical filter 65. Accordingly, the axial position of the first through hole 51 is to be adjusted so that these actions and effects can be exhibited.

Note that the communicating hole 80 formed in the inner cylinder 15 between the first combustion chamber and second combustion chamber is closed by the stainless steel seal tape 58, and hence the combustion gas in the first combustion chamber 20 does not flow into the second combustion chamber 25. All of the gas that is generated in the first combustion chamber 20 passes through the filter 65, ruptures the seal tape 75, and discharged into the air bag (not shown) through the gas discharge ports 17, 18.

The gas generated by the combustion of the first gas generating agents 20a, 20b enters the cylindrical filter 65 through the part not covered by the shielding plate 66 (or through gas vents), whereupon part of this gas travels through the cylindrical filter 65 as is in the axial direction to reach the gap 72 at the outer periphery side of the filter 65. The remainder of the combustion gas travels into the gap 71 on the inner periphery side of the filter 65, passes through the cylindrical filter 65 in the radial direction, and thus reaches the gap 72 on the outer periphery side of the filter 65. The combustion gas then ruptures all or part of the seal tape 75, and is thus discharged through all or a part of the gas discharge ports 17, 18, whereby the air bag is inflated.

By securing the gap 71 at the inner periphery side of the filter 65 defined by the shielding plate 66, the gas that passes through the gap 71 then passes through the cylindrical filter 65 in the axial direction. As a result, the entire cylindrical filter 65 is used, and therefore the contact time between the gas and the filter 65 is lengthened, enabling an improvement in the combustion gas cooling and filtering effects.

The second igniter 32 is activated with a brief time difference with the activation of the first igniter 31. The flame produced by an activation of the second igniter 32 passes through the second through hole 52, and advances directly into the second combustion chamber. When the flame (having energy to ignite unburned gas generating agent) enters the second combustion chamber, the second gas generating agent 25a having a higher combustion temperature is first ignited and burned in the second combustion chamber 25, whereupon the resulting flame causes the second gas generating agent 25b having a lower combustion temperature to ignite and burn. As described above, when the second gas generating agents are burned, the opening area of the communicating hole 80 provided in the upper portion of the inner cylinder 15 (or when the retainer 55 is provided with an opening, the opening portion thereof) and the height position at which the communicating hole 80 is formed have been adjusted. Therefore, the flame circulates favorably through the entire second combustion chamber 25, thus improving the ignitability and combustibility of the second gas generating agent. When the communicating hole 80 is closed by the seal tape 58, the initial combustibility of the second gas generating agent is improved.

The gas generated in the second combustion chamber 25 is ejected through the communicating hole 80 formed in the inner cylinder 15 in a radial direction, and flows into the first combustion chamber 20. The gas is then cooled and purified by the cylindrical filter 65 in a similar manner to that described above, and then discharged through the gas discharge holes 17, 18 to inflate the air bag further.

EXAMPLE

First Example

The gas generator for an air bag shown in FIG. 1 was manufactured. The details are as follows.

(1) Usage Amounts of Gas Generating Agents

First gas generating agent having a higher combustion temperature: 7 g

First gas generating agent having a lower combustion temperature: 90 g

Second gas generating agent having a higher combustion temperature: 15 g

Second gas generating agent 20b having a lower combustion temperature: 20 g (2) Form and Composition of Gas Generating Agents First and second gas generating agents having a higher combustion temperature A pellet form with an outer diameter of 1.5 mm and a length of 1.5 mm, having the following composition (combustion temperature: 2200° C.; generated gas amount: 2.5 mol/100 g):
nitroguanidine: 34.4% by mass;
strontium nitrate: 55.6% by mass; and
sodium carboxylmethylcellulose: 10.0% by mass.

First and second gas generating agents having a lower combustion temperature

A single-perforated cylindrical form with a through hole, having an outer diameter of 4.5 mm, an inner diameter of 1.2 mm, and a length of 4 mm, and having the following composition (combustion temperature: 1200° C.)
guanidine nitrate: 41% by mass;
basic copper nitrate: 49% by mass;
sodium carboxylmethylcellulose: not more than 5% by mass; and
aluminum hydroxide: 5% by mass.

Note that in the embodiment and example described above, description is based on a gas generator using two igniters. However, the present invention is not limited to this number of igniters, and may be applied to a gas generator with a single igniter or the like. In a gas generator such as that shown in FIG. 1 of JP-A No. 10-95303, for example, in which an inner cylinder is disposed inside a housing such that a combustion chamber charged with a gas generating agent is formed at the outside of the inner cylinder, an igniter is disposed in the lower side of the space inside the inner cylinder, and a transfer charge is disposed in the upper side, a gas generating agent having a higher combustion temperature may be charged into the inner cylinder instead of the transfer charge, and a gas generating agent having a lower combustion temperature may be charged into the combustion chamber at the outside of the inner cylinder.

The invention being thus described, it will be obvious that the same may be varied in many ways. Such variations are not to be regarded as a departure from the spirit and scope of the invention, and all such modifications are intended to be included within the scope of the following claims.

The invention claimed is:

1. A gas generator comprising:
a housing having a gas discharge port;
an inner cylinder provided inside the housing, the inner cylinder including a partition wall dividing the inner cylinder into an upper cylinder section and a lower cylinder section;
the upper cylinder section including a partition plate dividing the upper cylinder section into an upper space at the top of the upper cylinder section above the partition plate and a lower space below the partition plate and above the partition wall;
ignition means for starting an operation of the gas generator included in the lower cylinder section;
a first gas generating agent being directly ignited by the ignition means, the first gas generating agent having a first combustion temperature and having a gas generating capacity such that when ignited the first gas generating agent will generate an amount of gas that is not less than 1.2 mol/100 g;
a second gas generating agent being ignited only by combustion of the first gas generating agent, the second gas generating agent having a second combustion temperature lower than the first combustion temperature and having a gas generating capacity such that when ignited the second gas generating agent will generate an amount of gas that substantially contributes to inflation of the air bag;

a first combustion chamber defined in the housing, the first combustion chamber accommodating, therein, only the first gas generating agent; and a second combustion chamber defined in the housing, the second combustion chamber accommodating, therein, only the second gas generating agent, and an amount of the second gas generating agent is greater than an amount of the first gas generating agent.

2. A gas generator, comprising:

a housing;

an inner cylinder provided inside the housing, the inner cylinder including a partition wall dividing the inner cylinder into an upper cylinder section above the partition wall and a lower cylinder section below the partition wall;

the upper cylinder section including a partition plate dividing the upper cylinder section into a first space below the partition plate and above the partition wall and a second space above the partition plate, the first space including a first combustion chamber and the second space including a second combustion chamber;

the partition plate including at least one communication opening for allowing the first combustion chamber to directly communicate with the second combustion chamber, the second space further including at least one port for discharging gasses from both the first combustion chamber and the second combustion chamber to an area outside of the second space that is coupled to an air bag;

ignition means provided in the lower cylinder section below the partition wall;

a first gas generating agent disposed in the first combustion chamber and directly ignited by the ignition means to generate gas for inflating the air bag, the first gas generating agent having a first combustion temperature and having a gas generating capacity such that when ignited the first gas generating agent will generate an amount of gas that is not less than 1.2 mol/100 g; and a second gas generating agent disposed in the second combustion chamber and adapted to generate gas for inflating the air bag, the second gas generating agent having a second combustion temperature lower than the first combustion temperature and having a gas generating capacity such that when ignited the second gas generating agent will generate an amount of gas that substantially contributes to inflation of the air bag, wherein a total opening area of the at least one communication opening is determined based on a total surface area of the first gas generating agent.

3. The gas generator for an air bag as claimed in claim 2, wherein an interior of the first combustion chamber and an interior of the second combustion chamber have relative capacities in relation to an amount of the first gas generating agent contained in the first combustion chamber and an amount of the second gas generating agent contained in the second combustion chamber.

4. The gas generator for an air bag as claimed in claim 2, wherein the inner cylinder provided inside the housing extends between a diffuser shell and a closure shell of the housing.

5. The gas generator for an air bag as claimed in claim 2, wherein the first gas generating agent has a non-perforated shape and the second gas generating agent has a single-perforated cylindrical shape.

6. The gas generator as claimed in claim 2, wherein a total opening area of the at least one port is determined based on a total surface area of the second gas generating agent.

7. The gas generator for an air bag as claimed in claim 2, wherein the first gas generating agent is charged in an amount that enables the second gas generating agent to be ignited and burned by combustion of the first gas generating agent.

8. The gas generator for an air bag as claimed in claim 2 or 7, wherein the ignition means includes an electric igniter that is activated by applying an operating current in order to directly ignite the first gas generating agent.

9. The gas generator for an air bag as claimed in claim 2 or 7, wherein the first combustion temperature is between 1700 and 3000° C., and the second combustion temperature is between 1000 and 1700° C.

10. The gas generator for an air bag as claimed in claim 7, further comprising:

a third combustion chamber located inside the housing;

a fourth combustion chamber located inside the housing and having at least one second communication hole for allowing communication between the third combustion chamber and the fourth combustion chamber;

a third gas generating agent consisting of pellets and disposed in the third combustion chamber and adapted to generate gas to contribute to the inflation of the air bag, the third gas generating agent having a third combustion temperature;

a fourth gas generating agent disposed in the fourth combustion chamber and adapted to generate gas to contribute to the inflation of the air bag, the fourth gas generating agent having a fourth combustion temperature lower than the third combustion temperature; and second ignition means for directly igniting the third gas generating agent, such that combustion of the fourth gas generating agent is initiated by gasses and heat generated by combustion of the third gas generating agent communicated to the fourth gas generating agent through the at least one second communication hole, wherein the third combustion chamber accommodates only the third gas generating agent as a gas generating material.

11. The gas generator for an air bag as claimed in claim 10, wherein the third combustion temperature is between 1700 and 3000° C., and the fourth combustion temperature is between 1000 and 1700° C.

12. The gas generator as claimed in claim 10, wherein the third combustion chamber is formed in the lower cylinder section below the partition wall and the fourth combustion chamber is formed between a wall of the inner cylinder and the housing with the at least one second communication hole for allowing communication between the third combustion chamber and the fourth combustion chamber being formed as at least one opening in the wall of the inner cylinder.

* * * * *